(12) United States Patent
Howey

(10) Patent No.: US 11,360,478 B2
(45) Date of Patent: Jun. 14, 2022

(54) METHOD FOR THE OPERATION OF AN AUTONOMOUS INDUSTRIAL TRUCK AND INTRA-LOGISTICS SYSTEM WITH AN AUTONOMOUS INDUSTRIAL TRUCK

(71) Applicant: STILL GmbH, Hamburg (DE)

(72) Inventor: Ansgar Howey, Ahrensburg (DE)

(73) Assignee: STILL GmbH, Hamburg (DE)

(*) Notice: Subject to any disclaimer, the term of this patent is extended or adjusted under 35 U.S.C. 154(b) by 305 days.

(21) Appl. No.: 16/688,136

(22) Filed: Nov. 19, 2019

(65) Prior Publication Data
US 2020/0174479 A1 Jun. 4, 2020

(30) Foreign Application Priority Data
Dec. 4, 2018 (DE) .................. 10 2018 130 779.9

(51) Int. Cl.
| | | |
|---|---|---|
| G05D 1/02 | (2020.01) | |
| H04W 4/40 | (2018.01) | |
| G02B 27/01 | (2006.01) | |
| G05D 1/00 | (2006.01) | |
| G06T 19/00 | (2011.01) | |

(52) U.S. Cl.
CPC ....... *G05D 1/0212* (2013.01); *G02B 27/0172* (2013.01); *G05D 1/0022* (2013.01); *G05D 1/0088* (2013.01); *G06T 19/006* (2013.01); *H04W 4/40* (2018.02); *G05D 2201/0213* (2013.01)

(58) Field of Classification Search
CPC .. G05D 1/0212; G05D 1/0022; G05D 1/0088; G05D 2201/2013; H04W 4/40; G02B 27/0172

USPC .......................................................... 701/23
See application file for complete search history.

(56) References Cited

U.S. PATENT DOCUMENTS

| | | | |
|---|---|---|---|
| 10,539,787 B2* | 1/2020 | Haddick | G02B 27/0093 |
| 10,599,157 B2* | 3/2020 | Oshima | A61G 5/10 |
| 2011/0093134 A1* | 4/2011 | Emanuel | G05D 1/0297 |
| | | | 701/2 |
| 2015/0042485 A1* | 2/2015 | Suessemilch | B25J 9/1674 |
| | | | 340/815.4 |
| 2016/0378117 A1* | 12/2016 | Szatmary | G01S 7/51 |
| | | | 382/153 |
| 2017/0374511 A1* | 12/2017 | Buchmann | B66F 17/003 |
| 2018/0362158 A1* | 12/2018 | Zhang | G05D 1/0061 |
| 2020/0020165 A1* | 1/2020 | Tran | G06N 7/005 |
| 2020/0209875 A1* | 7/2020 | Marzani | G06K 9/6254 |

(Continued)

FOREIGN PATENT DOCUMENTS

| | | |
|---|---|---|
| CN | 107915169 A | 4/2018 |
| DE | 202006020026 U1 | 10/2007 |
| DE | 102013215409 A1 | 2/2015 |

*Primary Examiner* — Yazan A Soofi
(74) *Attorney, Agent, or Firm* — The Webb Law Firm

(57) ABSTRACT

A method for the operation of an autonomous industrial truck that can move independently in an operating environment as well as an intralogistics system with at least one autonomous truck with a vehicle control device that can move independently in an operating environment. Information on the path of movement of the industrial truck is transmitted to at least one signaling unit located outside the industrial truck, in which signaling unit signals are generated that signal the path of movement of the industrial truck in the operating environment of the industrial truck.

10 Claims, 1 Drawing Sheet

(56) References Cited

U.S. PATENT DOCUMENTS

| | | | |
|---|---|---|---|
| 2020/0249692 A1* | 8/2020 | Thode | B60R 11/04 |
| 2021/0089040 A1* | 3/2021 | Ebrahimi Afrouzi | A47L 9/2894 |
| 2021/0368906 A1* | 12/2021 | Andon | G01S 5/0027 |

* cited by examiner

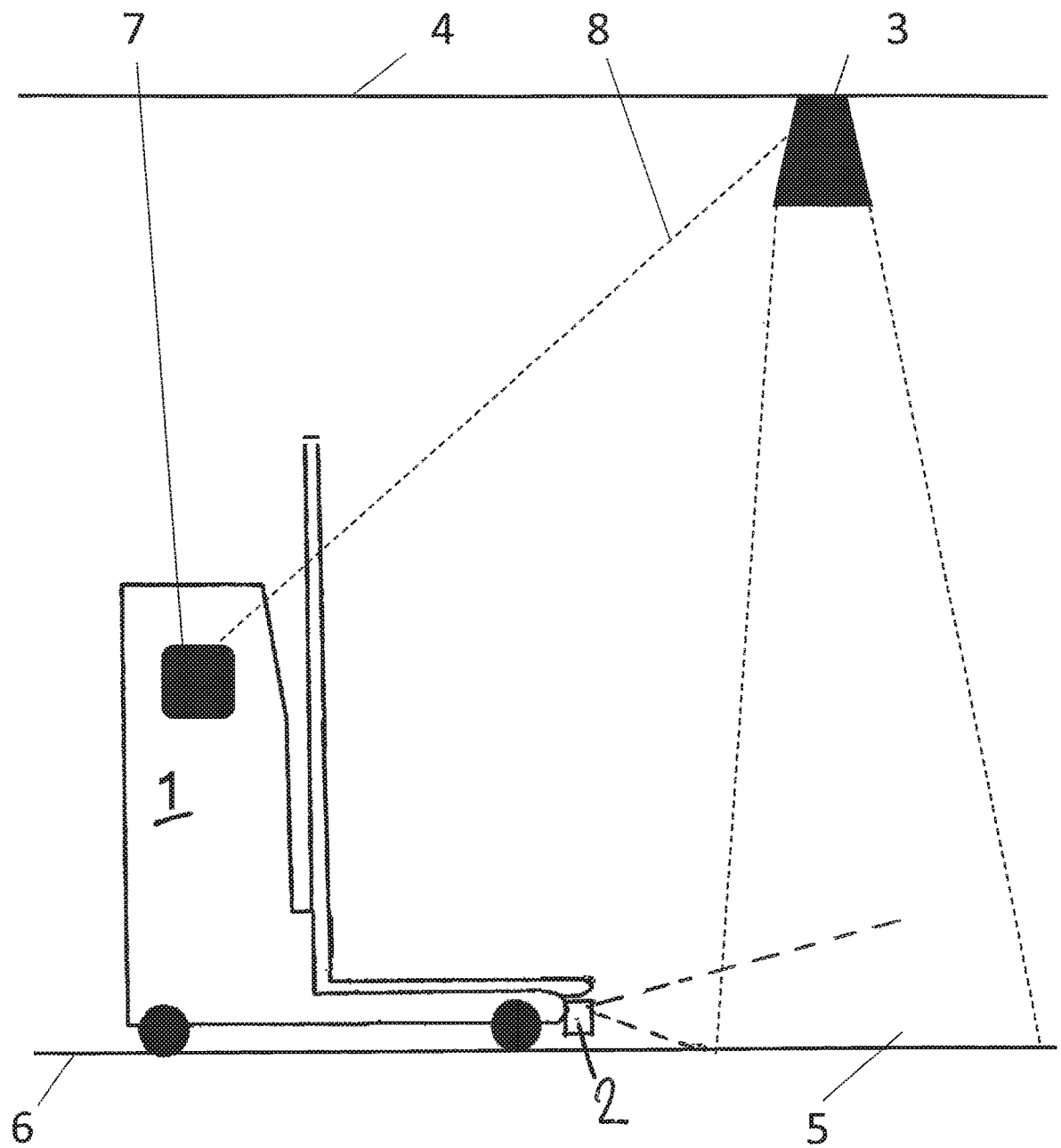

METHOD FOR THE OPERATION OF AN AUTONOMOUS INDUSTRIAL TRUCK AND INTRA-LOGISTICS SYSTEM WITH AN AUTONOMOUS INDUSTRIAL TRUCK

CROSS-REFERENCE TO RELATED APPLICATION

This application claims priority to German Patent Application No. 10 2018 130 779.9 filed Dec. 4, 2018, the disclosure of which is hereby incorporated by reference in its entirety.

BACKGROUND OF THE INVENTION

Field of the Invention

This invention relates to a method for the operation of an autonomous industrial truck that can move independently in an operating environment, as well as an intralogistics system with at least one autonomous truck with a vehicle control device, which autonomous truck can move independently in an operating environment.

Description of Related Art

An intralogistics system is a system in which logistical flows of materials and goods are handled within an operating site. This term is used to differentiate such operations from the transport of goods outside a plant, e.g. by an external shipping company. Intralogistics systems comprise in particular devices for storage and conveyance technology, hoists, industrial trucks, order pickers, palletizing units, packaging units and equipment specific to warehouses such as automatic garage doors, for example. Devices and equipment of this type are the technical participants of the intralogistics systems. This intralogistics system also includes the operating personnel who participate in the process, such as the operators of industrial trucks, warehouse employees and warehouse managers, for example.

Autonomous industrial trucks are becoming increasingly common in intralogistics. Autonomous industrial trucks belong to driverless transport vehicles. Driverless transport vehicles (Automated Guided Vehicles, AGV, in English) are floor-level transport vehicles with their own traction drive that are automatically controlled and guided in a contactless manner.

For example, autonomous industrial trucks are already in use that travel through warehouses without a driver and automatically actuate positions to pick up and deliver goods.

In all these cases, systems are required to monitor the environment, in particular to avoid collisions, so that safe operation of the autonomous industrial trucks is guaranteed and unintentional collisions with an obstacle can be prevented, not to mention injuries to a person in the path of the industrial truck.

The current methods for monitoring the environment on autonomous industrial trucks are based on distance measurements by means of laser, ultrasound or radar. These methods are used to determine the direct clearance of the autonomous industrial truck in the direction of travel.

To avoid collisions with persons, when the presence of a person in the path of travel is detected, the general procedure, for safety reasons, is for the industrial truck to stop and remain stopped until the person has moved out of the path of travel. That causes delays in operations.

DE 10 2013 215 409 A1 describes a projection unit for an independent mobile platform that is designed to emit a signal that projects the path of movement of the mobile platform, whereby the path is projected in the geographic vicinity of the mobile platform. For this purpose in particular a laser projection unit can be mounted on the mobile platform that projects the calculated and planned future path of movement of the mobile platform on the floor or roadway.

In this manner, persons in the vicinity of the autonomous platform can recognize the direction in which the mobile platform is moving and the path the mobile platform will travel. Persons can then react accordingly, for example by moving out of the way. As a result of the projection of the path of movement it is significantly easier for the affected persons not to cross the path of the mobile platform, so that the mobile platform can move essentially unhindered on its path of movement, which results in a significant saving of time in the operation of the mobile platform.

However, this system of the prior art has several disadvantages.

This known solution can be used only under certain conditions on vehicles with a low design height, because vehicles of this type have an unfavorable projection angle for the display of information in the vicinity, in particular on the floor and thus on the roadway.

In addition, when the entire surface of the upper side of the platform is used for the cargo being transported, the problem arises that there may not be any suitable location for a projection unit located on the platform that could reach all sides of the vehicle.

Moreover, when a large number of vehicles are used, it may be efficient for cost reasons not to have to equip each vehicle with a projection unit.

Finally, the projection units require a corresponding amount of space for installation on the vehicle. They also increase the weight of the vehicle and must be supplied with energy from the vehicle battery.

SUMMARY OF THE INVENTION

The object of the invention is to design a method and an intralogistics system of the type described above so that the disadvantages described above can be avoided.

This object is accomplished according to the invention by a method in which information about the path of movement of the industrial truck, in particular the future path of movement, is transmitted to at least one signaling unit located outside the industrial truck in which signals are generated that signal the path of movement of the industrial truck in the operating environment of the industrial truck.

According to the invention, therefore, a signaling unit is used that is not mounted on or in the vehicle itself but is located outside the industrial truck. The information about the calculated and planned future path of movement of the industrial truck, for example the path calculated and planned by the vehicle control system, is transmitted from the industrial truck, for example, via a wireless data link to the external signaling unit. In the signaling unit, signals are then generated to signal the path of movement of the industrial truck. Persons in the operating environment of the industrial truck can perceive these signals and recognize the path of movement of the industrial truck and can orient their subsequent behavior accordingly. For example, they can get out of the path of movement or wait until the industrial truck has passed a certain point.

The external signaling unit makes possible a favorable projection angle for the display of the future path of movement of the industrial truck in the operating environment.

On account of the external location of the signaling unit, the autonomous industrial truck is not burdened with the additional weight, installation space, energy consumption and costs of its own signaling unit. This location is advantageous in particular in intralogistics systems with a plurality of autonomous industrial trucks.

As the signaling unit, it is appropriate to use a stationary projection unit located in the operating environment, by which the signals are projected on a roadway/floor and/or on at least one wall and/or on a ceiling. The protection unit can thereby transmit optical and/or acoustical signals into the space.

Preferably, optical signals are projected so that the future path of movement of the industrial truck is indicated. For example, a virtual route of travel of the industrial truck can be projected onto the roadway or floor. For this purpose the route can be displayed in the form of a wide strip, for example. The width of the virtual route preferably equals the width of the industrial truck.

In an additional embodiment, the signaling unit used is additionally or alternatively a display unit integrated into the roadway or floor, with which the signals are displayed on the roadway or floor.

The signaling unit, both in the case of the projection and in the case of the display integrated into the roadway or floor, can be used to illuminate the roadway or floor.

The optical signals can be supplemented by acoustical signals, for example to warn persons of the risk of collision.

The optical signals also preferably include texts and/or graphic illustrations to provide the persons in the operating environment with additional information.

In one development of the invention, the signaling unit has a scan function with which vehicles and/or objects and/or persons in the operating environment can be detected and localized. Radio waves and/or laser beams, for example, can be used to perform this scan function. The data thus acquired (scan data) can be used to improve the navigation of the industrial truck. For this purpose, the scan data can, for example, be transmitted to a central computer unit that controls all of the processes conducted in an intralogistics system. The scan data can also be sent directly to the industrial truck. In a vehicle control unit of the industrial truck, the scan data can be analyzed and used for the independent navigation. For the transmission of the scan data from the signaling unit to the industrial truck, preferably the same data link is used as for the transmission of the information on the path of movement of the industrial truck (route data) from the industrial truck to the signaling unit. A wireless data link that can transmit data in both directions is preferably used for this purpose.

Advantageously both the scan data as well as the route data are processed in a data processing unit. In this manner the path of movement can be adapted on the basis of the current scan data, for example to avoid obstacles. For this process new route data are calculated that are also transmitted to the signaling unit. Therefore the alternate route can also be signaled. In this manner, persons in the operating environment of the industrial truck are informed that the industrial truck will be traveling the modified route.

The data processing unit can, for example, be integrated into the vehicle control system of the industrial truck.

It is particularly advantageous if the data processing unit is a component of the central computer unit of the intralogistics system. In this case, the data of all system participants of the intralogistics system can be processed centrally, so that a centralized control of the system becomes possible that also takes into consideration the scan data of the signaling unit and the route data of the industrial truck. In particular in intralogistics systems with a plurality of system participants, the use of a central computer unit is advantageous because, for example, not all of the participating industrial trucks need to be equipped with their own data processing units.

In an additional preferred configuration, the invention teaches that the signaling unit is a pair of glasses that can be worn by a person in the operating environment, into which the signals are overlaid in the form of virtual images. According to the invention, glasses of this type are used to inform persons in the operating environment of the planned path of movement of the industrial truck. The path of movement is thereby preferably overlaid quasi-realistically into the field of vision of the glasses.

The invention further relates to an intralogistics system with at least one autonomous industrial truck with a vehicle control device that can move independently in an operating environment.

In a system of this type, the object of the invention is accomplished in that the intralogistics system comprises at least one signaling unit that is located outside the industrial truck and is in an operative connection with the vehicle control device of the industrial truck, which signaling unit is designed to generate signals that signal the path of movement of the industrial truck in the operating environment of the industrial truck.

The signaling unit is preferably in operative communication with the vehicle control device of the industrial truck by means of a wireless data link. The wireless data link is advantageously a radio link, e.g. a component of a digital radio network. The information concerning the calculated and planned future path of movement of the industrial truck, for example the path calculated and planned by the vehicle control system, can be sent, for example, from the industrial truck via a wireless data link to the external signaling unit. In the signaling unit, signals are then generated to signal the path of movement of the industrial truck.

In one particularly advantageous embodiment, the signaling unit comprises a projection unit that is installed in a stationary manner in the operating environment and is designed to project the signals onto a roadway or floor and/or onto at least one wall and/or onto the ceiling.

The signaling unit, which for example is in the form of a projection unit, is advantageously located on a ceiling above the path of movement of the industrial truck. In this manner, the path of movement can be projected from above at a favorable projection angle directly onto the roadway or an adjacent wall without any objects interfering with the projection path.

The signaling unit is thereby preferably in the form of a laser projection unit. This configuration has the advantage that the signals, in particular text and symbols, can be projected with particular intensity and precision.

In an additional advantageous embodiment, the signaling unit comprises a headlight unit that is designed to illuminate the roadway. It thereby becomes possible to economically illuminate both the roadway and the operating environment in general, as well as to achieve an effective signaling of the path of movement of the industrial truck.

Alternatively or additionally, the signaling unit preferably comprises a display unit integrated into a floor or roadway and is designed to display signals on the roadway. For this purpose the signaling unit is appropriately equipped with light emitting diodes. Particularly advantageously, organic light emitting diodes (OLED) are used that consist of light-emitting thin-film components made of organic semiconducting materials. These light emitting diodes can be manufactured in flat form to cover wide areas and are particularly suitable for integration into floors or roadways.

The signaling unit can also be installed only on selected sections of the roadway of the route of the industrial truck, in particular in hazardous spots and/or intersections and/or areas with mixed traffic of autonomous and manually controlled industrial trucks or areas with mixed traffic of autonomous industrial trucks and persons.

To also make possible a scan function of the signaling unit for the localization of vehicles and/or objects and/or persons, the signaling unit is preferably equipped with at least one laser scanner. For the analysis of the scan data from the laser scanner, the laser scanner is in operational communication with a data processing device. The data processing device is advantageously a component of the central computer unit of the intralogistics system, so that an overall control of the system becomes possible, which also takes into consideration the scan data of the signaling unit and the route data of the industrial truck. For this purpose, the signaling unit and the vehicle control device of the industrial truck are in operational communication preferably via a wireless data link with bidirectional data transmission, in particular a digital wireless link, with the central computer unit of the intralogistics system.

In an additional advantageous configuration of the intralogistics system, the signaling unit comprises augmented reality glasses that can be worn by persons in the operating environment, which are designed to superimpose the signals in the form of virtual images.

BRIEF DESCRIPTION OF THE DRAWING

Additional advantages and details of the invention are explained in greater detail below with reference to the exemplary embodiment illustrated in FIG. 1.

DESCRIPTION OF THE INVENTION

FIG. 1 shows an autonomous industrial truck 1 that moves independently on a roadway 6. To monitor the operating environment of the industrial truck 1, an environmental sensor 2, for example a laser scanner or a camera, is located on the industrial truck 1. The data from the environmental sensor 2 are analyzed in a vehicle control device 7 and used for the autonomous control of the industrial truck 1.

Information on the planned path of movement of the industrial truck 1 are transmitted from the vehicle control device 7 via a wireless data link 8 to an external signaling unit 3. In the illustrated exemplary embodiment the signaling unit 3 is in the form of a projection unit 3 and is mounted on the ceiling 4 above the roadway 6. The projection unit can be in the form of a DMD (Digital Micro Device) projector, for example.

In the projection unit 3, signals are generated that signal the future path of movement of the industrial truck 1. For this purpose the projection unit 3 projects an image 5 of the planned path of movement of the industrial truck 1 onto the roadway 6.

In this manner, persons in the vicinity of the operating environment of the industrial truck 1 are informed of the planned path of movement of the industrial truck 1 and can adapt their behavior accordingly, for example by not entering this area or by leaving it.

Furthermore, the projection unit 3 can also be used for the general illumination of the operating environment of the industrial truck 1.

While various embodiments of the industrial truck were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A method for an operation of an autonomous industrial truck that moves independently in an operating environment, comprising:
   transmitting, from a vehicle control device positioned with the autonomous industrial truck, information concerning a planned path of movement of the autonomous industrial truck to at least one projector via a wireless data link, wherein the at least one projector is positioned in the operating environment remotely from the autonomous industrial truck; and
   projecting, with the at least one projector and based on the information concerning the planned path of movement, an image of the planned path of movement of the autonomous industrial truck in the operating environment of the autonomous industrial truck.

2. The method according to claim 1, wherein the at least one projector is located in a stationary manner in the operating environment, and wherein the image is projected onto at least one of a roadway, on at least one wall, and on a ceiling by the at least one projector.

3. The method according to claim 1, wherein the at least one projector is used to illuminate a roadway on which the autonomous industrial truck operates.

4. The method according to claim 1, wherein the at least one projector has a scan function with which at least one of a vehicle, objects, and persons in the operating environment are located.

5. An intralogistics system comprising:
   an autonomous industrial truck configured to moves independently in an operating environment;
   a vehicle control device positioned with the autonomous industrial truck, wherein the vehicle control device is configured to transmit information concerning a planned path of movement of the autonomous industrial truck to at least one projector via a wireless data link; and
   the at least one projector positioned in the operating environment remotely from the at least one autonomous industrial truck, wherein the at least one projector is in operational communication with the vehicle control device via the wireless data link, and wherein the at least one projector is configured to project, based on the information concerning the planned path of movement, an image of the planned path of movement of the autonomous industrial truck in the operating environment of the autonomous industrial truck.

6. The intralogistics system according to claim 5, wherein the at least one projector is located in a stationary manner in the operating environment, and wherein the image is projected onto at least one of a roadway, on at least one wall, and on a ceiling.

7. The intralogistics system according to claim 5, wherein the at least one projector is located on a ceiling above the planned path of movement of the autonomous industrial truck.

8. The intralogistics system according to claim 7, wherein the at least one projector is used to illuminate a roadway.

9. The intralogistics system according to claim 5, wherein the at least one projector is equipped with light-emitting diodes.

10. The intralogistics system according to claim 5, wherein the at least one projector is equipped with at least one laser scanner.

* * * * *

UNITED STATES PATENT AND TRADEMARK OFFICE
CERTIFICATE OF CORRECTION

| | | |
|---|---|---|
| PATENT NO. | : 11,360,478 B2 | Page 1 of 1 |
| APPLICATION NO. | : 16/688136 | |
| DATED | : June 14, 2022 | |
| INVENTOR(S) | : Ansgar Howey | |

It is certified that error appears in the above-identified patent and that said Letters Patent is hereby corrected as shown below:

In the Claims

Column 6, Line 48, Claim 5, delete "moves" and insert -- move --

Signed and Sealed this
Sixteenth Day of May, 2023

Katherine Kelly Vidal
*Director of the United States Patent and Trademark Office*